(12) United States Patent
Kweon

(10) Patent No.: US 12,368,564 B2
(45) Date of Patent: Jul. 22, 2025

(54) METHOD AND APPARATUS FOR SUPPORTING UDM UPDATE DATA FOR NPN

(71) Applicant: Samsung Electronics Co., Ltd., Gyeonggi-do (KR)

(72) Inventor: Kisuk Kweon, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 326 days.

(21) Appl. No.: 17/884,102

(22) Filed: Aug. 9, 2022

(65) Prior Publication Data

US 2023/0048220 A1    Feb. 16, 2023

(30) Foreign Application Priority Data

Aug. 9, 2021 (KR) .......................... 10-2021-0104896

(51) Int. Cl.
*H04L 5/00* (2006.01)
*H04W 48/18* (2009.01)
*H04W 60/00* (2009.01)

(52) U.S. Cl.
CPC ........... *H04L 5/0055* (2013.01); *H04W 48/18* (2013.01); *H04W 60/00* (2013.01)

(58) Field of Classification Search
CPC .... H04L 5/0055; H04W 48/18; H04W 60/00; H04W 8/18; H04W 60/04; H04W 48/16; H04W 84/10; H04W 8/02; H04W 84/045
See application file for complete search history.

(56) References Cited

U.S. PATENT DOCUMENTS

2021/0314836 A1  10/2021  Liu
2023/0075285 A1*  3/2023  Jung .................... H04W 48/18
2023/0354181 A1*  11/2023  Lin ...................... H04W 48/18

FOREIGN PATENT DOCUMENTS

WO   WO 2020/124462   6/2020
WO   WO 2020/251226   12/2020

OTHER PUBLICATIONS

3GPP TS 23.502 V17.1.0, 3GPP, 3rd Generation Partnership Project; Technical Specification Group Services and System Aspects; Procedures for the 5G System (5GS); Stage 2 (Release 17), Jun. 2021, 693 pages.

(Continued)

*Primary Examiner* — Kyaw Z Soe
(74) *Attorney, Agent, or Firm* — The Farrell Law Firm, P.C.

(57) ABSTRACT

Disclosed is a method, performed by an access and mobility management function, of providing a user equipment (UE) with update information regarding at least one UE parameter. The method includes receiving, from the UE, a registration request message, transmitting, to a unified data management (UDM), a UE context management registration message based on the registration request message, receiving, from the UDM, update information regarding the UE parameter, in response to the UE context management registration message, wherein the update information regarding the UE parameter includes information regarding preferred SNPN and information regarding a list of group identifiers for network selection (GINs), and transmitting, to the UE, the update information regarding the UE parameter including the information regarding preferred SNPN and the information regarding the list of GINs.

15 Claims, 7 Drawing Sheets

(56) References Cited

OTHER PUBLICATIONS

Huawei, HiSilicon, "Update of Prioritized List of Preferred SNPNs and Group IDs to the UE", S2-2104215, 3GPP TSG-WG SA2 Meeting #145E e-meeting, May 17-28, 2021, 12 pages.
Huawei, HiSilicon, Ericsson, "Update of CH Controlled Prioritized List of Preferred SNPNs and GINs", S2-2105013, 3GPP TSG-WG SA2 Meeting #145E e-meeting, May 17-28, 2021, 4 pg.
Huawei, HiSilicon, "Update of CH Controlled Prioritized List of Preferred SNPNs and GINs", S2-2104176, 3GPP TSG-WG SA2 Meeting #145E e-meeting, May 17-28, 2021, 4 pages.
International Search Report dated Nov. 14, 2022 issued in counterpart application No. PCT/KR2022/011866, 10 pages.
MediaTek Inc., "Updating the Credentials Holder Controlled Lists for SNPN Selection", S2-2104607, 3GPP TSG-SA WG2 Meeting #145E, May 17-28, 2021, 3 pages.
Nokia et al., "Discussion on UE Parameters Update During Registration", C1-196132, 3GPP TSG-CT WG1 Meeting #120, Oct. 7-11, 2019, 6 pages.
European Search Report dated Sep. 10, 2024 Issued in counterpart application No. 22856183.3-1215, 14 pages.

\* cited by examiner

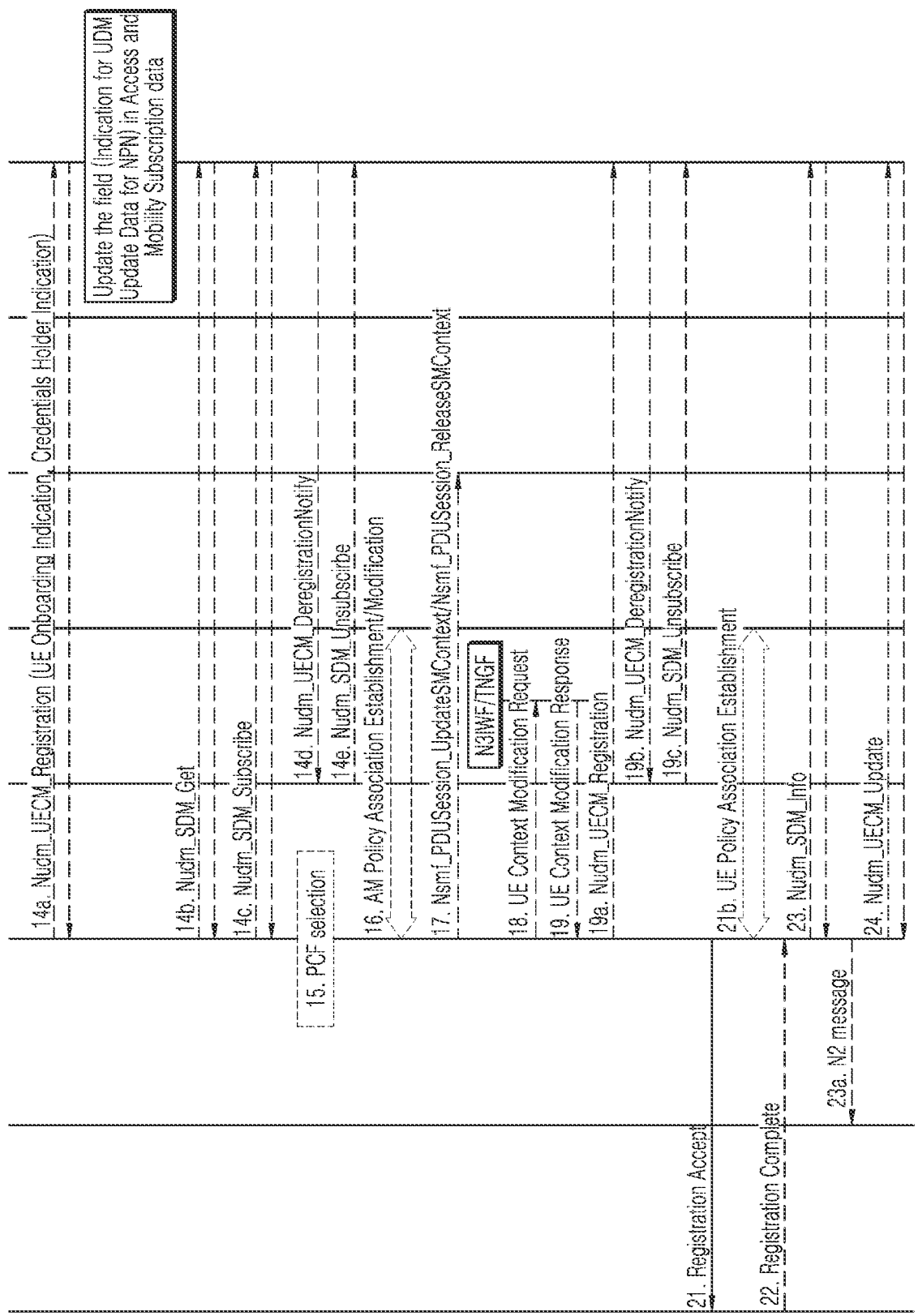

METHOD AND APPARATUS FOR SUPPORTING UDM UPDATE DATA FOR NPN

CROSS-REFERENCE TO RELATED APPLICATION(S)

This application is based on and claims priority under 35 U.S.C. § 119 to Korean Patent Application No. 10-2021-0104896, which was filed in the Korean Intellectual Property Office on Aug. 9, 2021, the entire disclosure of which is incorporated herein by reference.

BACKGROUND

1. Field

The disclosure relates generally to a communication system and, more particularly, to a scheme of updating information for a non-public network (NPN) in a user equipment (UE) that supports the NPN, the information being stored in a unified data management (UDM).

2. Description of the Related Art

5th generation (5G) mobile communication technologies define broad frequency bands such that high transmission rates and new services are possible, and can be implemented not only in sub 6 GHz bands such as 3.5 GHz, but also in above 6 GHz bands referred to as mmWave including 28 GHz and 39 GHz. In addition, it has been considered to implement 6th generation (6G) mobile communication technologies (referred to as beyond 5G systems) in terahertz bands (for example, 95 GHz to 3 THz bands) in order to accomplish transmission rates up to fifty times faster than 5G mobile communication technologies and ultra-low latencies one-tenth of 5G mobile communication technologies.

Since the beginning of the development of 5G mobile communication technologies, in order to support services and to satisfy performance requirements in connection with enhanced mobile broadband (eMBB), ultra-reliable low latency communications (URLLC), and massive machine-type communications (mMTC), there has been ongoing standardization regarding beamforming and massive multiple-input and multiple-output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio (NR) unlicensed (NR-U) aimed at system operations conforming to various regulation-related requirements in unlicensed bands, NR UE Power Saving, non-terrestrial network (NTN) which is UE-satellite direct communication for providing coverage in an area in which communication with terrestrial networks is unavailable, and positioning.

There has also been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random-access-channel (RACH) for NR).

There has also been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks. Accordingly, it is accordingly expected that enhanced functions and performances of 5G mobile communication systems and integrated operations of connected devices will be necessary. To this end, new research is scheduled in connection with eXtended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Further, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below.

An aspect of the disclosure is to provide a method and apparatus for effectively providing a service in a wireless communication system.

According to an aspect of the disclosure, a method, performed by an access and mobility management function (AMF), of providing a UE with update information regarding at least one UE parameter is provided. The method includes receiving, from the UE, a registration request message; transmitting, to a unified data management (UDM), a UE context management registration message based on the registration request message; receiving, from the UDM, update information regarding the UE parameter, in response to the UE context management registration message, wherein the update information regarding the UE parameter includes information regarding preferred SNPN and information regarding a list of group identifiers for network selection (GINs); and transmitting, to the UE, the update information regarding the UE parameter including the information regarding preferred SNPN and the information regarding the list of GINs.

According to another aspect of the disclosure, a method is provided, performed by a UE, of receiving update information regarding at least one UE parameter. The method includes transmitting, to an access and mobility management function (AMF), a registration request message; and receiving, from a unified data management (UDM) via the AMF, the update information regarding the UE parameter including information regarding preferred SNPN and information regarding a list of group identifiers for network selection (GINs).

According to another aspect of the disclosure, a method, performed by a UDM, of providing a UE with update information regarding at least one UE parameter is provided. The method includes receiving, from an access and mobility management function (AMF), a UE context management registration message; obtaining update information regarding the UE parameter based on the UE context management registration message, wherein the update information regarding the UE parameter includes information regarding preferred SNPN and information regarding a list of group identifiers for network selection (GINs); and transmitting, to the UE via the AMF, the update information regarding the UE parameter including the information regarding preferred SNPN and the information regarding the list of GINs.

According to another aspect of the disclosure, a UDM is provided for providing a UE with update information regarding at least one UE parameter. The UDM includes a transceiver and at least one processor coupled to the transceiver and configured to receive, from the UE, a registration request message, transmit, to a unified data management (UDM), a UE context management registration message based on the registration request message, receive, from the UDM, the update information regarding the UE parameter in response to the UE context management registration message, wherein the update information regarding the UE parameter includes information regarding preferred SNPN and information regarding a list of group identifiers for network selection (GINs), and transmit, to the UE, the update information regarding the UE parameter including the information regarding preferred SNPN and the information regarding the list of GINs.

According to another aspect of the disclosure, a UE is provided for receiving update information regarding at least one UE parameter. The UE includes a transceiver and at least one processor coupled to the transceiver and configured to transmit, to an access and mobility management function (AMF), a registration request message, and receive, from a unified data management (UDM) via the AMF, the update information regarding the UE parameter including information regarding preferred SNPN and information regarding a list of group identifiers for network selection (GINs).

According to another aspect of the disclosure, a UDM for providing a UE with update information regarding UE parameter is provided. The UDM includes a transceiver, and at least one processor coupled to the transceiver and configured to receive, from an access and mobility management function (AMF), a UE context management registration message, obtain the update information regarding the UE parameter based on the UE context management registration message, wherein the update information regarding the UE parameter includes information regarding preferred SNPN and information regarding a list of group identifiers for network selection (GINs), and transmit, to the UE via the AMF, the update information regarding the UE parameter including the information regarding preferred SNPN and the information regarding the list of GINs.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2A and FIG. 2B illustrate a registration management procedure of a UE;

DETAILED DESCRIPTION

Figure 1:
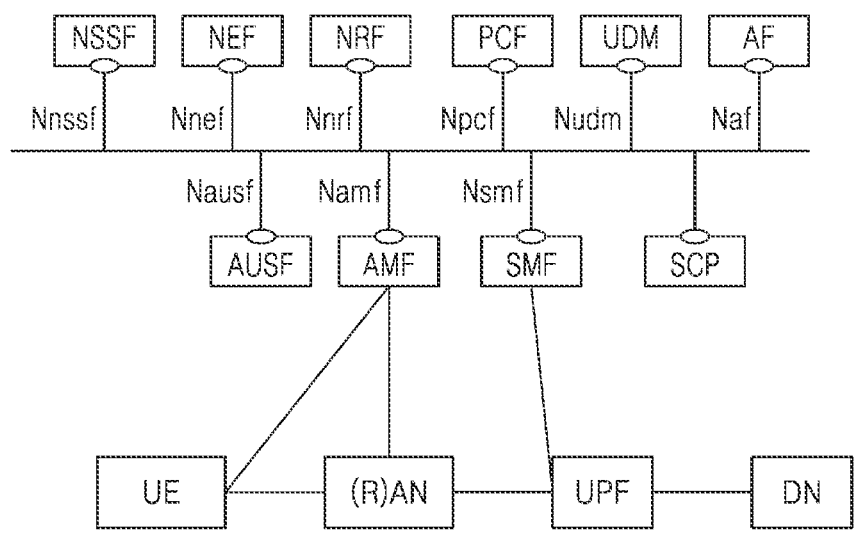
FIG. 1 illustrates a structure of a 5G network according to an embodiment of the disclosure.

According to embodiments of the disclosure, a UE that supports an NPN may store information only for the UE supporting the NPN in a UDM and the UDM may update the information in the UE. Here, the network has to determine whether to apply an update procedure with respect to the information by identifying whether the UE supports the NPN. A scheme is provided by which, when the UE registers in the network, the UE informs the network about whether the UE is able to support an NPN function. Thus, the network provides the UE with an indication of whether to perform an update procedure with respect to the information.

Hereinafter, embodiments of the disclosure will now be described more fully with reference to the accompanying drawings. In the accompanying drawings, like reference numerals may denote like elements. Also, detailed descriptions of well-known functions and configurations in the art may be omitted when it is deemed that they may unnecessarily obscure the essence of the disclosure.

When embodiments of the disclosure are described herein, descriptions of techniques which are well known in the technical field to which the disclosure pertains and are not directly related to the disclosure will be omitted. This is to clearly convey the concept of the disclosure by omitting descriptions of unnecessary details.

In the drawings, some elements may be exaggerated, omitted, or roughly illustrated. Also, size of each element does not exactly correspond to an actual size of each element. In the drawings, elements that are the same or are in correspondence may be identified with the same or similar reference numerals.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided for completeness, and to fully convey the concept of the disclosure to one of ordinary skill in the art.

The expression at least one of a, b or c indicates only a, only b, only c, both a and b, both a and c, both b and c, all of a, b, and c, or variations thereof.

A layer may also be referred to as an entity.

Each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

Herein, the term . . . unit may refer to a software or hardware component, such as field-programmable gate array (FPGA) or application-specific integrated circuit (ASIC), which performs certain tasks. However, the term . . . unit is not limited to software or hardware. A . . . unit may be configured to be in an addressable storage medium or configured to operate one or more processors. Thus, a . . . unit may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and . . . units may be combined into fewer components and . . . units or further separated into additional components and . . . units. Further, the components and . . . units may be implemented to operate one or more central processing units (CPUs) in a device or a secure multimedia card.

Hereinafter, a base station (BS) is an entity that allocates resources to a terminal, and may be at least one of a Node B, an eNode B (eNB), a gNode B (gNB), a radio access unit, a BS controller, or a node on a network. A terminal may include a UE, a mobile station (MS), a cellular phone, a smartphone, a computer, or a multimedia system capable of performing a communication function. Also, the embodiments may be applied to other communication systems having similar technical backgrounds or channel types. The embodiments of the disclosure may also be applied to other communication systems through partial modification without greatly departing from the scope of the disclosure based on determination by one of ordinary skill in the art.

Hereinafter, terms identifying an access node, terms indicating network entities, terms indicating messages, terms indicating an interface between network entities, and terms indicating various pieces of identification information, as used in the following descriptions, are exemplified for convenience of explanation. Accordingly, the disclosure is not limited to terms to be described below, and other terms indicating objects having equal technical meanings may be used.

For convenience of descriptions, the disclosure uses some of terms and names defined in the $3^{rd}$ Generation Partnership Project (3GPP) long term evolution (LTE) standards. However, the disclosure is not limited to these terms and names, and may be equally applied to communication systems conforming to other standards.

In accordance with an embodiment of the disclosure, a scheme is provided by which, when a UE registers in a network, the UE informs whether the UE supports an NPN so as to determine whether to perform a process of updating, in the UE, NPN-associated information stored in a UDM.

FIG. 1 illustrates a structure of a 5G network according to an embodiment of the disclosure.

Descriptions of network entities or network nodes which configure the 5G network are provided below.

A radio access network (RAN) is an entity that allocates radio resources to a terminal, and may be at least one of a eNode B, a Node B, a BS, a next-generation radio access network (NG-RAN), a 5G-AN, a radio access unit, a BS controller, or a node on a network. The terminal may include a UE, a next-generation UE (NG UE), an MS, a cellular phone, a smartphone, a computer, or a multimedia system capable of performing a communication function. Although a 5G system is mentioned as an example in the following description, embodiments may also be applied to other communication systems having similar technical backgrounds. Also, embodiments of the disclosure are applicable to other communication systems through modification at the discretion of one of ordinary skill in the art without greatly departing from the scope of the disclosure.

A wireless communication system has developed from a $4^{th}$ generation (4G) system to a 5G system and for which a new core network such as a next-generation (NG) core network or a 5G core network (5GC) network is defined. The new core network has generated network functions (NFs) by virtualizing all existing network entities (NEs). Each NF may indicate a network entity, a network component, or a network resource.

The 5GC may include NFs illustrated in FIG. 1. However, the 5GC is not limited to the example of FIG. 1, and may include more NFs or fewer NFs than the NFs illustrated in FIG. 1.

n AMF may be an NF for managing mobility of a UE.

A session management function (SMF) may be an NF for managing packet data network (PDN) connection provided for the UE. The PDN connection may be referred to as a protocol data unit (PDU) session.

A policy control function (PCF) may be an NF to apply a mobile network operator's service policy, charging policy, and PDU session policy to the UE.

UDM may be an NF for storing information about subscribers.

A network exposure function (NEF) may be a function for providing information about the UE to a server outside a 5G network. Also, the NEF may provide a function of providing the 5G network with information necessary for a service and storing the information in a user data repository (UDR).

A user plane function (UPF) may serve as a gateway to forward user data to a data network (DN).

A network repository function (NRF) may perform a function for discovering an NF.

An authentication server function (AUSF) may perform authentication of the UE in a 3GPP access network and a non-3GPP access network.

A network slice selection function (NSSF) may perform a function for selecting a network slice instance to be provided to the UE.

A DN may be a data network via which the UE transmits or receives data so as to use a service of a network operator or a service of a $3^{rd}$ party.

The 5GC may provide a scheme by which a home public land mobile network (HPLMN) may update, in the UE, UE parameters stored in a UDM via a process of UE parameters updated via UDM Control Plane. UDM update data provided by the UDM to the UE may include two pieces of indication information such as updated default configured network slice selection assistance information (NSSAI), updated routing indicator data and UE acknowledgement requested indication information or re-registration requested indication information which are UE parameters. The plurality of pieces of information above may be UE parameters that may be updated in all UEs.

On the other hand, UE parameter information only for a UE supporting an NPN may be stored in an UDM and may be updated, in the UE, via a process of UE parameters update via UDM control plane or a steering of roaming (SoR) procedure. UE parameters for the UE supporting an NPN may include network slice-specific authentication and authorization (NSSAA) credentials, PDU session authentication credentials, CH controlled prioritized list of preferred stand-alone non-public network (SNPNs), GINs and SNPN credentials.

Figure 2A:
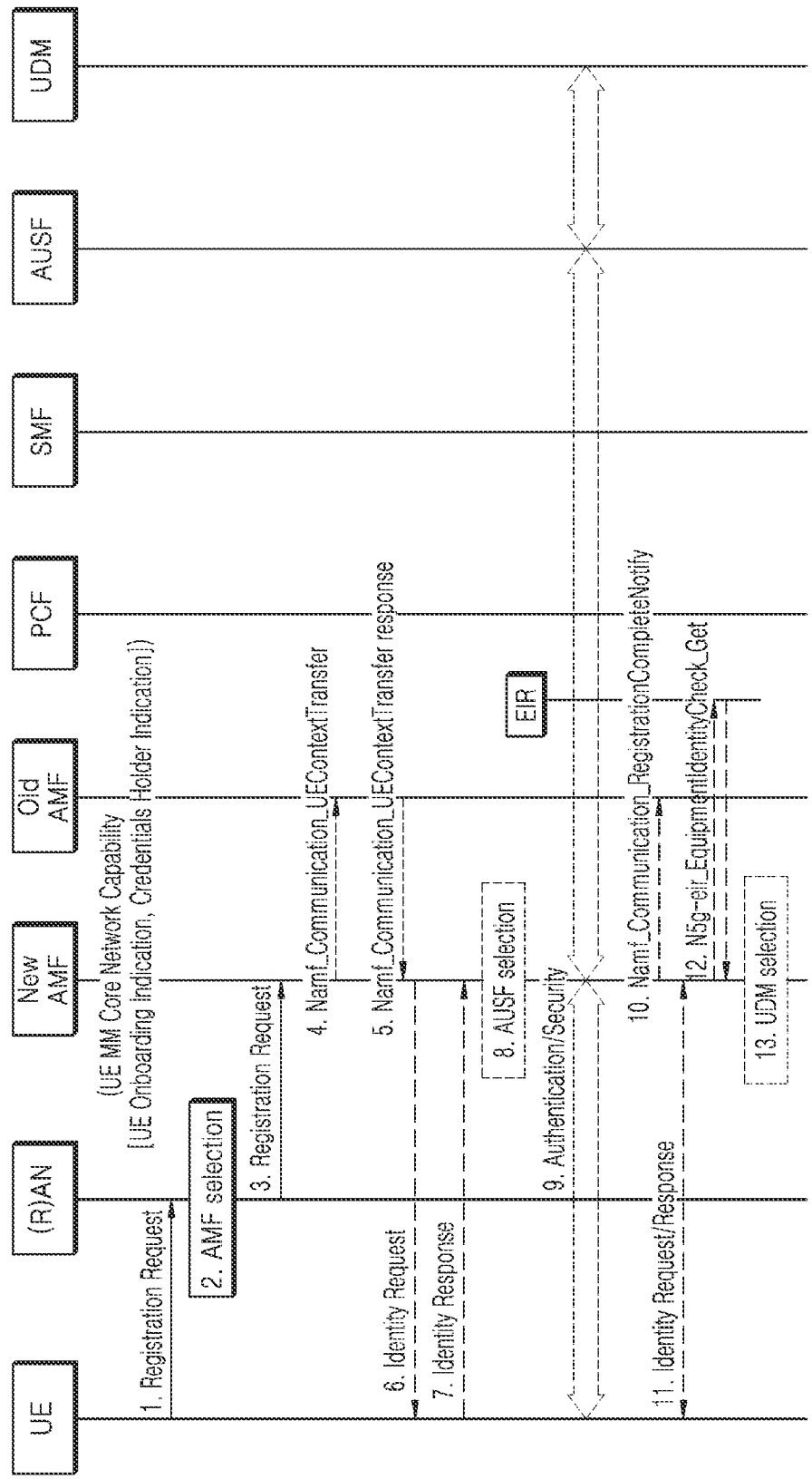

FIG. 2A and FIG. 2B illustrate a registration management procedure of a UE. The registration management procedure may be performed when the UE performs mobility registration update, periodic registration update, emergency registration or SNPN onboarding registration as the UE moves to a new tracking area (TA) when the UE performs initial registration in a 5G system.

In operation 1, the UE transmits a registration request message for registration in a network. This message may include a UE MM core network capability field. This field may be divided into an S1 UE network capability field and a UE 5GMM core network capability field. The UE 5GMM core network capability field may include UE network capability information associated with a 5G core network (5GCN) and UE network capability information associated with interworking with an evolved packet system (EPS). The UE MM core network capability information may be stored in an AMF, and when the UE performs initial registration and mobility registration update, the UE may transmit the information to the AMF for update with new information.

When the UE is able to support the functions set forth below, the UE may inform the network by indicating the capability in the UE 5GMM core network capability field. However, the disclosure is not limited thereto.

Attach in EPC with request type handover in a PDN connectivity request message

EPC non access stratum (NAS)

SMS over NAS location service (LCS)

5G single-radio voice call continuity (SRVCC) from NG-RAN to UTRAN

Radio capabilities signaling optimization (RACS)

Network slice-specific authentication and authorization

Parameters in supported network behavior for 5G CIoT

Receiving wake-up signal (WUS) assistance information closed access group (CAG)

When the UE supports an NPN, the UE may inform, by indicating the capability in the UE 5GMM core network capability field, the network about whether the UE supports the below functions.

UE onboarding

Authentication and authorization with a CH

When the UE supports UE onboarding, the UE may include UE onboarding indication information in the UE MM core network capability field, and when the UE supports authentication and authorization with CH, the UE may include credentials holder indicator information in the UE MM core network capability field.

In operations 2, 3, 4, and 5, the AMF is selected, a registration request is sent, a communication content transfer is sent, and a communication content transfer is received, respectively. In operations 6, 7, 8, 9, and 10, an identity request is sent, and identity response is received, an AUSF is selected, authentication is performed, and a notification is provided of registration, respectively. In operations 11, 12, and 13, an identity request/response is provided, an equipment check is provided, and a UDM is selected, respectively. In operations 14a-c, the AMF registers the UE in a UDM by using a Nudm_UECM_Registration message (Nudm_UE Context management_registration). When the AMF does not have subscription data with respect to the UE, the AMF may bring, from the UDM via a Nudm_SDM_Get message, information such as access and mobility subscription data, SMF selection subscription data, UE context in SMF data, or the like.

In operation 14a, when the UE indicates UE onboarding indication or credentials holder indication in the UE MM core network capability field, and the AMF supports the indicated one, the AMF may inform the UDM of this. The UDM may update an Indication for UDM Update Data for NPN field in the access and mobility subscription data. This field may indicate whether the UE and the network support UE onboarding and authentication and authorization with CH functions, and accordingly, the UDM may determine whether to update a plurality of pieces of associated information in the UE via the process of UE Parameters Update via UDM control plane or the SoR procedure.

Table 1, below, shows access and mobility subscription data stored in the UDM. However, the disclosure is not limited thereto.

TABLE 1

| Subscription data type | Field | Description |
| --- | --- | --- |
| Access and Mobility Subscription data (data needed for UE Registration and Mobility Management) | GPSI List | List of the GPSI (Generic Public Subscription Identifier) used both inside and outside of the 3GPP system to address a 3GPP subscription (see NOTE 9). |
| | Internal Group ID-list | List of the subscribed internal group(s) that the UE belongs to. |
| | Subscribed_UE-AMBR | The maximum aggregated uplink and downlink MBRs to be shared across all Non-GBR QoS Flows according to the subscription of the user. |
| | Subscribed UE-Slice-MBR(s) | List of maximum aggregated uplink and downlink MBRs to be shared across all GBR and Non-GBR QoS Flows related to the same S-NSSAI according to the subscription of the user. There is a single uplink and a single downlink value per S-NSSAI. |
| | Indication for UDM Update Data for eNPN | Indicates whether UDM Update Data for UE Onboaring and/or Credential Holder is supported or not |
| | UDM Update Data for eNPN/Steering of Roaming | Includes a set of parameters to be delivered from UDM to the UE via NAS signaling (e.g. NSSAA credentials, PDU Session authentication credentials, SNPN credentials, and/or Preferred SNPN and List of supported Group IDs for Network Selection (GINs)) |

The Indication for UDM Update Data for NPN field may indicate whether the UE and the network support the UE onboarding and authentication and authorization with CH functions. Accordingly, the UDM may determine whether to update the plurality of pieces of associated information in the UE via the process of UE parameters update via UDM control plane or the SoR procedure.

UDM Update Data for NPN may include a plurality of items of data to be updated in the UE via the process of UE parameters update via UDM control plane or the SoR procedure. When the UE and the network support UE onboarding, the UDM Update Data for NPN may include NS SAA credentials, PDU Session authentication credentials or SNPN credentials information. When the UE and the network support authentication and authorization with the CH, the UDM Update Data for NPN may include Preferred SNPN and List of supported GINs information.

Figure 3:
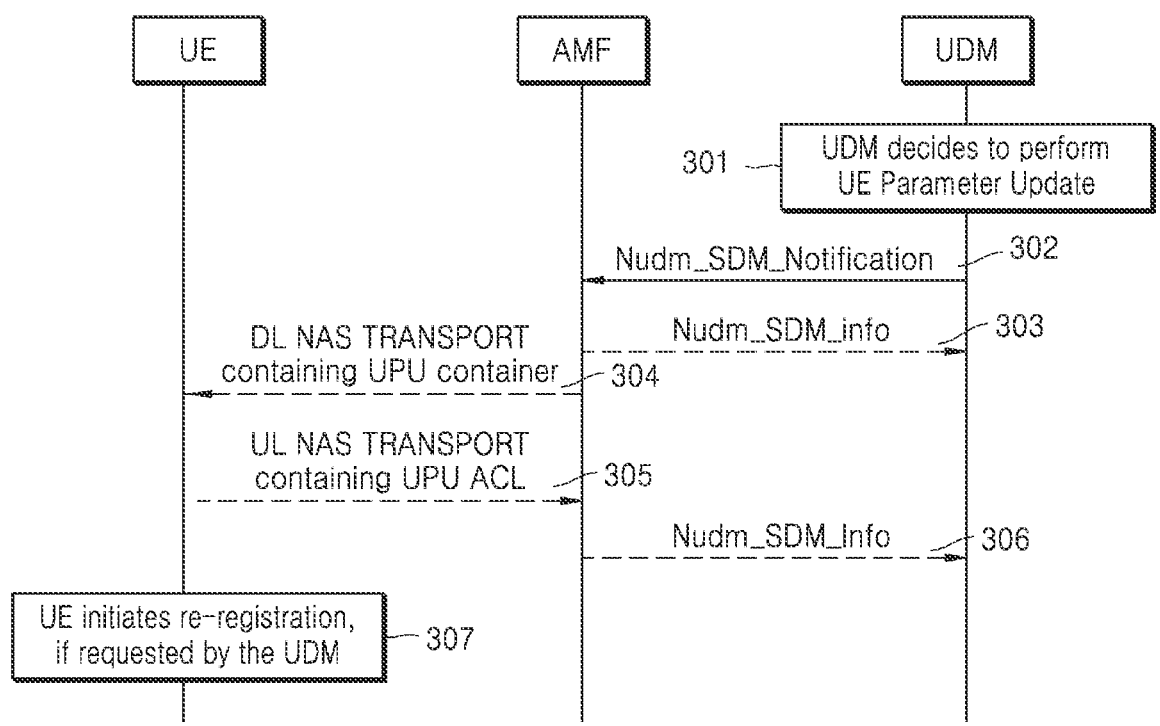
FIG. 3 illustrates a process of UE parameters update via a UDM control plane.

FIG. 3 illustrates a process of UE parameters update via a UDM control plane.

Referring to FIG. 3, In operation 301, a UDM may perform an update of UE parameters including NSSAA credentials, PDU Session authentication credentials, SNPN credentials, preferred SNPN and list of supported GINs, or the like.

In operation 302, the UDM may inform a change in UE-associated information by transmitting Nudm_SDM_Notification message to an AMF that manages a corresponding UE. The message may include UDM update data for NPN.

In operation 303, when the UE is not reachable to the AMF, the AMF may inform the UDM about a failure of UDM Update Data for NPN data transmission, via Nudm_SDN_Info message. The UDM may perform pending on a process of UE parameters update via UDM control plane and may skip a process thereafter.

In operation 304, the AMF may transmit, to the UE via DL NAS TRANSPORT message, data transmitted from the UDM.

In operation 305, when the UE identifies that UDM update data for NPN is transmitted from the AMF (HPLMN) and the UDM requests the UE for an Ack, the UE may transmit, to the AMF, UL NAS TRANSPORT message including the Ack.

In operation 306, the AMF may transmit the message transmitted from the UE to the UDM via Nudm_SDN_Info message.

In operation 307, when the UDM requests the UE for re-registration, the UE may perform a registration procedure when the UE is in an RRC idle state. The above-described procedure in FIG. 3 may also be applied to a SoR procedure.

Figure 4:
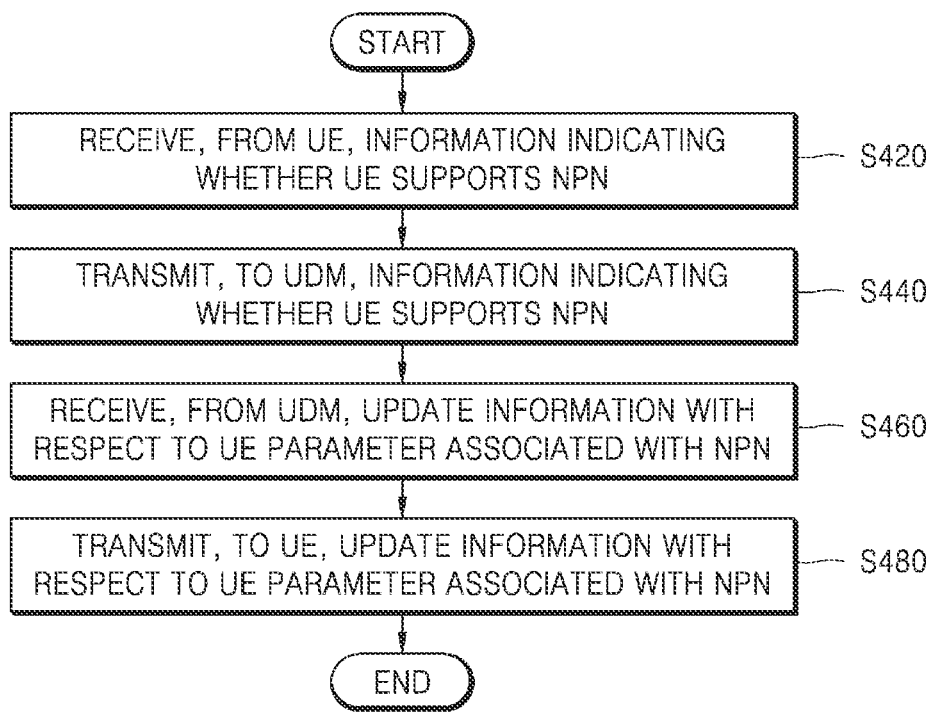
FIG. 4 illustrates a procedure in which an AMF provides a UE with update information with respect to a UE parameter according to an embodiment of the disclosure.

FIG. 4 illustrates a procedure in which an AMF provides a UE with update information with respect to a UE parameter according to an embodiment.

Referring to FIG. 4, in step S420, the AMF receives, from the UE, information indicating whether the UE supports an NPN. The information indicating whether the UE supports an NPN may include UE onboarding information or authentication and authorization with a CH. For example, when the UE supports UE onboarding, the UE may include UE onboarding indication information in a UE MM core network capability field, and when the UE supports authentication and authorization with a CH, the UE may include credentials holder indication information in the UE MM core network capability field.

In step S440, the AMF transmits, to a UDM, the information indicating whether the UE supports an NPN. When the UE indicates UE onboarding indication or credentials holder indication in the UE MM core network capability field, and the AMF supports the indicated one, the AMF may inform the UDM of this.

The UDM may determine whether to update a UE parameter associated with an NPN, based on the information indicating whether the UE supports the NPN. For example, the UDM may determine, based on the information indicating whether the UE supports the NPN, whether to update an indication for UDM update data for NPN field in access and mobility subscription data via a process of update via UDM control plane or an SoR procedure.

In step S460, the AMF receives, from the UDM, update information with respect to the UE parameter associated with the NPN. The UDM may transmit, to the AMF, Nudm_SDM_Notification indicating a change in the UDM update data for NPN and UE-associated information.

In step S480, the AMF transmits, to the UE, the update information with respect to the UE parameter associated with the NPN. The AMF may transmit, to the UE via DL NAS transport message, data transmitted from the UDM. Alternatively, when the UE is not reachable to the AMF, the AMF may inform the UDM about a failure of UDM update data for NPN data transmission, via Nudm_SDN_Info message.

Figure 5:
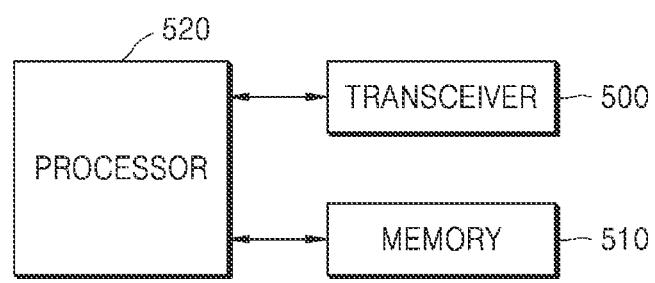
FIG. 5 illustrates a configuration of a UE according to an embodiment of the disclosure.

FIG. 5 illustrates a configuration of a UE according to an embodiment.

Referring to FIG. 5, the UE includes a processor 520 controlling all operations of the UE, a transceiver 500 including a transmitter and a receiver, and a memory 510. However, the configuration of the UE is not limited to the example, and the UE may include more elements or fewer elements than the elements illustrated in FIG. 5.

The transceiver 500 may transmit or receive a signal to or from network entities or other UE. The signal transmitted to or received from the network entities may include control information and data. Also, the transceiver 500 may receive signals via wireless channels and output the signals to the processor 520, and may transmit signals output from the processor 520, via wireless channels.

The processor 520 may control the UE to perform operations of one of the embodiments of the disclosure. The processor 520, the memory 510, and the transceiver 500 may not be necessarily implemented as separate modules, and may be implemented as one configuration unit such as a single chip. The processor 520 and the transceiver 500 may be electrically connected to each other. The processor 520 may refer to an application processor (AP), a communication processor (CP), a circuit, an application-specific circuit, or at least one processor.

The memory 510 may store basic programs, application programs, and data such as configuration information, etc. for operations of the UE. In particular, the memory 510 provides stored data, in response to a request of the processor 520. The memory 510 may be implemented as a storage medium including a read only memory (ROM), a random access memory (RAM), a hard disk, a compact disc (CD)-ROM, a digital versatile disc (DVD), etc., or any combination thereof. The memory 510 may refer to a plurality of memories. Further, the processor 520 may perform the aforementioned embodiments based on a program for performing the aforementioned embodiments, the program being stored in the memory 510.

Figure 6:
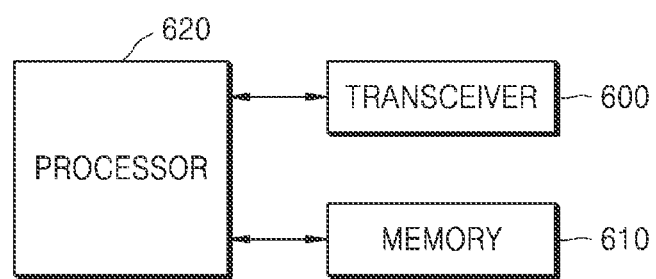
FIG. 6 illustrates a configuration of a network entity according to an embodiment of the disclosure.

FIG. 6 illustrates a configuration of a network entity according to an embodiment.

Referring to FIG. 6, the network entity includes a processor 620 controlling all operations of the network entity, a transceiver 600 including a transmitter and a receiver, and a memory 610. However, the configuration of the network entity is not limited to the example, and the network entity may include more elements or fewer elements than the elements illustrated in FIG. 6.

The transceiver 600 may transmit or receive a signal to or from at least one of other network entities or other UE. The signal transmitted to or received from at least one of other network entities or other UE may include control information and data.

The processor 620 may control a network entity to perform operations of one of the embodiments. The processor 620, the memory 610, and the transceiver 600 may not be necessarily implemented as separate modules, and may be implemented as one configuration unit such as a single chip. Further, the processor 620 and the transceiver 600 may be electrically connected to each other. The processor 620 may refer to an AP, a CP, a circuit, an application-specific circuit, or at least one processor.

The memory 610 may store basic programs, application programs, and data such as configuration information, etc., for operations of the network entity. In particular, the memory 610 provides stored data, in response to a request of the processor 620. The memory 610 may be implemented as a storage medium including a ROM, a RAM, a hard disk, a CD-ROM, a DVD, etc., or any combination thereof. The memory 610 may refer to a plurality of memories. Further, the processor 620 may perform the aforementioned embodiments based on a program for performing the aforementioned embodiments of the disclosure, the program being stored in the memory 610.

The configuration diagram, the exemplary diagrams of a method of transmitting a control signal or a data signal, the exemplary diagrams of operation procedures, and the configuration diagrams are not intended to limit the scope of the disclosure. That is, all configuration units, entities, or operations described in the embodiments of the disclosure should not be constructed as necessary elements for implementing the disclosure, and the embodiments of the disclosure including only some elements may be implemented without damaging the concept of the disclosure. Also, the embodiments of the disclosure may be combined to be implemented, when required. For example, the network entity and the UE may be operated in a manner that portions of methods proposed in the disclosure are combined with each other.

The aforementioned operations of the BS or the UE may be implemented in a manner that a memory device storing corresponding program codes is arranged in a random configuration unit in the BS or the UE. That is, a controller in the BS or the UE may execute the aforementioned operations by controlling a processor or a CPU of the BS or the UE to read and thus to execute the program codes stored in the memory device.

Various configuration units, modules, or the like of the entity, the BS, or the UE, which are described in the present specification, may operate by using a hardware circuit including a complementary metal-oxide semiconductor (CMOS)-based logic circuit, firmware, software, and/or a hardware circuit such as a combination of hardware and firmware and/or software inserted into a machine-readable medium. For example, various electric structures and methods may be implemented by using transistors, logic gates, and electric circuits such as application-specific semiconductors.

When the methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments of the disclosure described in the claims or the detailed description.

The programs (e.g., software modules or software) may be stored in RAM, non-volatile memory including flash memory, ROM, electrically erasable programmable read-only memory (EEPROM), a magnetic disc storage device, a CD-ROM, a DVD, another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible via a communication network such as the Internet, an intranet, a local area network (LAN), a wireless LAN (WLAN), or a storage area network (SAN), or a combination thereof. The storage device may be connected via an external port to an apparatus according to the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Specific embodiments of the disclosure are described in the descriptions of the disclosure, but it will be understood that various modifications may be made without departing the scope of the disclosure. Thus, the scope of the disclosure is not limited to the embodiments described herein and should be defined by the appended claims and their equivalents. In other words, it will be apparent to one of ordinary skill in the art that other modifications based on the technical ideas of the disclosure are feasible. Also, the embodiments of the disclosure may be combined with each other as required. For example, portions of the methods provided by the disclosure may be combined with each other to enable the BS and the UE to operate. Also, although the embodiments of the disclosure are described based on 5G and NR systems, modifications based on the technical scope of the embodiments may be applied to other communication systems such as LTE, LTE-Advanced (LTE-A), LTE-A-Pro systems, or the like.

The embodiments of the disclosure provide an apparatus and method for effectively providing a service in a wireless communication system.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by an access and mobility management function (AMF) in a wireless communication system, the method comprising:
    receiving, from a user equipment (UE), a registration request message including 5th generation (5G) system mobility management (5GMM) capability information;
    transmitting, to a unified data management (UDM), a UE context management registration message;
    receiving, from the UDM, steering of roaming (SOR) information wherein the SOR information includes information regarding a credentials holder controlled prioritized list of preferred stand-alone non-public networks (SNPNs) and information regarding a credentials holder controlled prioritized list of group identifiers for network selection (GINs); and
    transmitting, to the UE, the SOR information including the information regarding the credentials holder controlled prioritized list of the preferred SNPNs and the information regarding the credentials holder controlled prioritized list of the GINs,
    wherein the 5GMM capability information is associated with that the UE supports an SNPN.

2. The method of claim 1, wherein transmitting the SOR information including the information regarding the credentials holder controlled prioritized list of the preferred SNPNs and the information regarding the credentials holder controlled prioritized list of the GINs comprises transmitting, to the UE in which an access to an SNPN is supported, the SOR information.

3. The method of claim 1, wherein the 5GMM capability information is associated with that the UE can receive at least one of the credentials holder controlled prioritized list of the preferred SNPNs and the credentials holder controlled prioritized list of the GINs via the SOR information.

4. The method of claim 1, wherein the SOR information comprises information for requesting an acknowledgement (Ack) from the UE for the SOR information, and
    wherein the method further comprises, in case that the Ack from the UE is received based on the information for requesting the Ack, transmitting the Ack from the UE to the UDM.

5. A method performed by a user equipment (UE) in a wireless communication system, the method comprising:
    transmitting, to an access and mobility management function (AMF), a registration request message including fifth generation (5G) system mobility management (5GMM) capability information; and
    receiving, from a unified data management (UDM), via the AMF, steering of roaming (SOR) information including information regarding a credentials holder controlled prioritized list of preferred stand-alone non-public networks (SNPNs) and information regarding a credentials holder controlled prioritized list of group identifiers for network selection (GINs),
    wherein the 5GMM capability information is associated with that the UE supports an SNPN.

6. The method of claim 5, wherein the UE supports an access to the SNPN.

7. The method of claim 5, wherein the 5GMM capability information is associated with that the UE can receive at least one of the credentials holder controlled prioritized list of the preferred SNPNs and the credentials holder controlled prioritized list of the GINs via the SOR information.

8. The method of claim 5, wherein the SOR information comprises information for requesting an acknowledgement (Ack) from the UE for the SOR information, and
    wherein the method further comprises transmitting the Ack for the SOR information.

9. A method performed by a unified data management (UDM) in a wireless communication system, the method comprising:
    receiving, from an access and mobility management function (AMF), a user equipment (UE) context management registration message;
    obtaining steering of roaming (SOR) information, wherein the SOR information includes information regarding a credentials holder controlled prioritized list of preferred stand-alone non-public networks (SNPNs) and information regarding a credentials holder controlled prioritized list of group identifiers for network selection (GINs); and
    transmitting, to a UE, via the AMF, the SOR information including the information regarding the credentials holder controlled prioritized list of the preferred SNPNs and the information regarding the credentials holder controlled prioritized list of the GINs.

10. The method of claim 9, wherein transmitting the SOR information comprises transmitting, to the UE in which an access to the SNPN is supported, via the AMF, the SOR information.

11. The method of claim 9, wherein the 5GMM capability information is associated with that the UE can receive at least one of the credentials holder controlled prioritized list of the preferred SNPNs and the credentials holder controlled prioritized list of the GINs via the SOR information.

12. The method of claim 9, wherein the SOR information comprises information for requesting an acknowledgement (Ack) from the UE for the SOR information, and
wherein, the method further comprises receiving, from the AMF, the Ack for the SOR information.

13. An access and mobility management function (AMF) in a wireless communication system, the AMF comprising:
a transceiver; and
at least one processor coupled to the transceiver and configured to:
receive, from the UE, a registration request message, including fifth generation (5G) system mobility management (5GMM) capability information;
transmit, to a unified data management (UDM), a user equipment (UE) context management registration message based on the registration request message;
receive, from the UDM, steering of roaming (SOR) information in response to the UE context management registration message, wherein the SOR information includes information regarding a credentials holder controlled prioritized list of preferred stand-alone non-public networks (SNPNs) and information regarding a credentials holder controlled prioritized list of group identifiers for network selection (GINs); and
transmit, to the UE, the SOR information including the information regarding the credentials holder controlled prioritized list of the preferred SNPNs and the information regarding the credentials holder controlled prioritized list of the GINs,
wherein the 5GMM capability information is associated with that the UE supports an SNPN.

14. A user equipment (UE) in a wireless communication system, the UE comprising:
a transceiver; and
at least one processor coupled to the transceiver and configured to:
transmit, to an access and mobility management function (AMF), a registration request message including fifth generation (5G) system mobility management (5GMM) capability information; and
receive, from a unified data management (UDM), via the AMF, steering of roaming (SOR) information including information regarding a credentials holder controlled prioritized list of preferred stand-alone non-public networks (SNPNs) and information regarding a credentials holder controlled prioritized list of group identifiers for network selection (GINs),
wherein the 5GMM capability information is associated with that the UE supports an SNPN.

15. A unified data management (UDM) in a wireless communication system, the UDM comprising:
a transceiver; and
at least one processor coupled to the transceiver and configured to:
receive, from an access and mobility management function (AMF), a user equipment (UE) context management registration message,
obtain steering of roaming (SOR) information based on the UE context management registration message, wherein the SOR information includes information regarding a credentials holder controlled prioritized list of preferred stand-alone non-public networks (SNPNs) and information regarding a credentials holder controlled prioritized list of group identifiers for network selection (GINs), and
transmit, to the UE, via the AMF, the SOR information including the information regarding the credentials holder controlled prioritized list of the preferred SNPNs and the information regarding the credentials holder controlled prioritized list of the GINs.

* * * * *